United States Patent
Anglin et al.

(10) Patent No.: US 8,330,967 B2
(45) Date of Patent: Dec. 11, 2012

(54) CONTROLLING THE PRINT QUALITY LEVELS OF IMAGES PRINTED FROM IMAGES CAPTURED BY TRACKED IMAGE RECORDING DEVICES

(75) Inventors: Debbie Ann Anglin, Austin, TX (US); Howard Neil Anglin, Austin, TX (US); Frank Anthony Nuzzi, Round Rock, TX (US); Jan Rogoyski, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 1170 days.

(21) Appl. No.: 11/426,437

(22) Filed: Jun. 26, 2006

(65) Prior Publication Data
US 2007/0296982 A1 Dec. 27, 2007

(51) Int. Cl.
- G06F 3/12 (2006.01)
- H04N 1/40 (2006.01)
- H04N 5/225 (2006.01)
- G06K 15/00 (2006.01)
- G06K 9/46 (2006.01)

(52) U.S. Cl. ...... 358/1.12; 358/1.15; 358/449; 382/232; 348/375; 348/231.1; 348/207.1; 715/229

(58) Field of Classification Search .................. 358/906, 358/449, 1.15; 382/232; 348/375, 231.1, 348/207.1; 715/229
See application file for complete search history.

(56) References Cited

U.S. PATENT DOCUMENTS

| | | | | |
|---|---|---|---|---|
| 5,138,459 A * | 8/1992 | Roberts et al. | ............. | 348/231.6 |
| 5,493,335 A * | 2/1996 | Parulski et al. | ............. | 348/231.6 |
| 6,041,143 A * | 3/2000 | Chui et al. | .................... | 382/232 |
| 6,147,709 A * | 11/2000 | Martin et al. | ................. | 348/239 |
| 6,157,439 A * | 12/2000 | Rousseau et al. | ............... | 355/61 |
| 6,246,797 B1 | 6/2001 | Caster et al. | | |
| 6,515,705 B1 * | 2/2003 | Fumio et al. | .................. | 348/375 |
| 6,727,973 B2 * | 4/2004 | Mizumo | .......................... | 355/40 |
| 6,885,395 B1 * | 4/2005 | Rabbani et al. | ............ | 348/231.1 |
| 7,124,427 B1 * | 10/2006 | Esbensen | ...................... | 725/109 |
| 7,197,271 B2 * | 3/2007 | Nakamura et al. | ............ | 399/341 |
| 7,262,783 B2 * | 8/2007 | Kramer et al. | ............... | 345/629 |
| 7,336,775 B2 * | 2/2008 | Tanaka et al. | ............. | 379/93.17 |
| 7,458,015 B2 * | 11/2008 | Wang | ............................ | 715/229 |
| 7,573,514 B2 * | 8/2009 | Pasquarette et al. | ........ | 348/240.2 |
| 7,839,517 B1 * | 11/2010 | Kinjo | ................................ | 358/1.15 |
| 7,876,357 B2 * | 1/2011 | Jung et al. | .................. | 348/207.1 |
| 8,139,259 B2 * | 3/2012 | Shinchi et al. | ............... | 358/1.18 |
| 2002/0097411 A1 * | 7/2002 | Roche et al. | ................... | 358/1.9 |
| 2003/0146997 A1 * | 8/2003 | Fredlund et al. | ......... | 348/333.02 |
| 2003/0231241 A1 * | 12/2003 | Iida | ............................ | 348/207.99 |
| 2004/0001148 A1 * | 1/2004 | Takemoto | ................... | 348/211.8 |
| 2004/0027608 A1 * | 2/2004 | Kinjo | ........................... | 358/1.15 |

(Continued)

Primary Examiner — Akwasi M Sarpong
(74) Attorney, Agent, or Firm — J. B. Kraft; David A. Mims

(57) ABSTRACT

A host on the World Wide Web acquires a variety of facilities as subscribers and then proceeds to undertake control of the printing of images captured at the various subscribing facilities. A user is enabled to select the quality of image content captured by a digital camera. An implementation for capturing said image content at a facility controlled by a facility host includes a user computer station connected to said Web, apparatus for printing the captured image content associated with the user computer station, the user is enabled to select a level of image print quality for said captured image, the user computer station controlling the printing is connected to the remote facility host and a control implementation enables the facility host to permit said printing means to print the captured image at the user selected image print quality.

18 Claims, 5 Drawing Sheets

U.S. PATENT DOCUMENTS

| | | | |
|---|---|---|---|
| 2004/0075750 A1* | 4/2004 | Bateman | 348/231.1 |
| 2004/0260625 A1* | 12/2004 | Usami et al. | 705/26 |
| 2005/0001926 A1* | 1/2005 | Lee et al. | 348/371 |
| 2006/0028675 A1* | 2/2006 | Watanabe et al. | 358/1.15 |
| 2006/0077053 A1* | 4/2006 | Park et al. | 340/521 |
| 2006/0146140 A1* | 7/2006 | Kennedy | 348/211.2 |
| 2006/0170956 A1* | 8/2006 | Jung et al. | 358/1.15 |
| 2006/0285150 A1* | 12/2006 | Jung et al. | 358/1.15 |
| 2007/0014550 A1* | 1/2007 | Dote et al. | 396/1 |
| 2007/0291172 A1* | 12/2007 | Kouzimoto et al. | 348/488 |
| 2008/0101762 A1* | 5/2008 | Kellock et al. | 386/52 |
| 2009/0262193 A1* | 10/2009 | Anderson | 348/157 |

* cited by examiner

CONTROLLING THE PRINT QUALITY LEVELS OF IMAGES PRINTED FROM IMAGES CAPTURED BY TRACKED IMAGE RECORDING DEVICES

CROSS-REFERENCE TO RELATED PATENT APPLICATION

The following copending patent application, which is assigned to the same assignee as the present invention, covers subject matter related to the subject matter of the present patent application: application Ser. No. 11/426,430 filed on the same date as the present Application, entitled: A UNIVERSAL METHOD OF CONTROLLING THE RECORDING OF AUDIO-VISUAL PRESENTATIONS BY DATA PROCESSOR CONTROLLED RECORDING DEVICES, D. A. Anglin et al., hereby incorporated by reference.

TECHNICAL FIELD

The present invention relates to computer controlled consumer electronics devices or instruments and particularly to implementations for controlling the unauthorized use of image recording devices, e.g. electronic cameras and video cameras.

BACKGROUND OF RELATED ART

The past decade has been marked by a technological revolution driven by the convergence of the data processing industry with the consumer electronics industry. The effect has, in turn, driven consumer electronics technologies that have been known and available but relatively quiescent over the years to now come into great demand in the marketplace.

The rapid expansion in the capacity of computers to perform support functions, the greater and greater miniaturization of computers, as well as reduction in costs to perform memory and computer operations has opened the door for computer controlled consumer instrumentation. This has resulted in a new generation of computer or data processor controlled image capturing devices, e.g. electronic or digital cameras that are miniaturized so as to not be noticeable when carried by users. An example of this proliferation of these image capturing devices is the video camera incorporated into a major portion of current cellular telephones. The uncontrolled usage of such devices has resulted in the unwarranted intrusion on the privacy of individual people. However, of even greater commercial and governmental significance, the uncontrolled usage of such devices results in the theft of a wide variety of commercial, artistic and governmental image content data presentations and transactions that are electronic entertainment and artistic property, commercially confidential or classified as government secrets.

SUMMARY OF THE PRESENT INVENTION

The present invention is directed towards the control of the described unauthorized use of image capturing recording devices, e.g. digital cameras. There are two aspects of the present invention. Both aspects involve control over the print quality of image content printed from recorded or stored images captured at a facility providing the image content. The copending cross-referenced application describes a wide variety of facilities that may wish to entirely prohibit the printing of image content captured therein because of the commercial value of the images. Such facilities would include those providing all forms of visual entertainment, e.g. plays, shows, films and circuses; those presenting new and, perhaps, products that can be copied, e.g. fashion shows and technical product releases; and any of the visual arts where there is a proprietary interest in preventing unrestricted copying, e.g. art museums. Such facilities are more completely described in the referenced copending patent application.

The first aspect of the invention involves direct control at the facility providing the image content of the quality of eventually made prints of image content captured at the facility. This aspect involves initially predetermining a plurality of levels of image print quality by a facility providing the image content. This would include a level wherein there would be no printing of content permitted under particular circumstances. An example of this would be an art museum facility wherein the user would be permitted to capture and print images of art in a first chamber of the museum but completely prohibited from capturing and/or printing content in another chamber. A user would then be enabled to select a level of image print quality and capture the image content with said recording device at said facility. Printing of the captured content with the appropriate limitation could be carried out at the facility providing the content. This would be under circumstances wherein the facility would provide printing apparatus. It is more likely that the user would save the stored captured image content and subsequently print at an appropriate image printer.

Under any of the printing circumstances, the facility providing the content would control the quality level of the eventually printed images. As will be subsequently described in greater detail and as is also described in the above-referenced copending application, the facility would sense the presence of the identified camera at a particular location and send short range RF signals to the camera that could directly limit the digital recording by the camera to the resolution appropriate to the selected printed image quality. Alternatively, the RF signals could merely embed an indicator of the selected quality level into the captured image. In such a case, the image would be captured at a uniform resolution level. Then, when the image printing would eventually be done, the image printing system would sense the selected embedded indicator of quality level and print the image at that quality level. This last approach has the additional advantage of permitting the user to change the selected image print quality of the stored captured image after the user has left the facility but before printing. It is understood that under appropriate circumstances the facility may charge fees based upon the selected printed image quality levels.

A further aspect of the present invention may involve a host on the World Wide Web (Web) or Internet or any other like network. The host acquires a variety of facilities as subscribers and proceeds to undertake control of the printing of images captured at the various subscribing facilities. Accordingly, a Web network system for enabling a user to select the quality of image content captured by image recording devices comprising means for capturing said image content at a facility controlled by a facility host, a user computer station connected to said Web, means for printing said captured image content associated with said user computer station, means enabling said user to select a level of image print quality for said captured image, means on the Web for connecting said remote facility host to said user computer station and control means enabling said facility host to permit said printing means to print said captured image at said user selected image print quality. For best results in this host based system, the image captured at the subscribing facility should be captured at a single quality level and the host would then control the image quality of the printed image based upon an indicator of the selected quality level.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
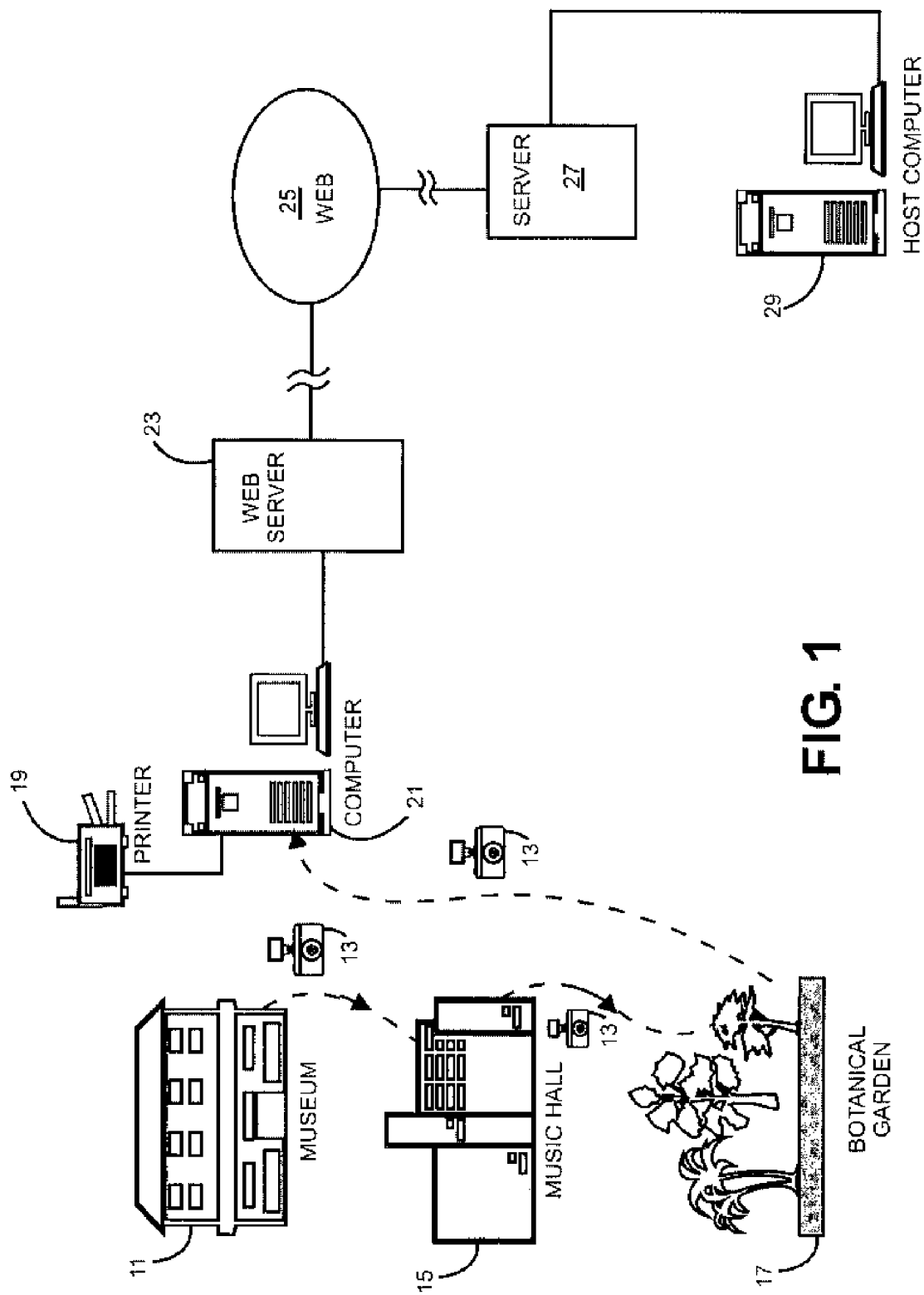
FIG. 1 is an illustrative diagrammatic view of a Web host that monitors and controls image capturing recording devices within a variety of image content providing facilities to control the image quality of printed images in accordance with the present invention.

Referring to FIG. 1, an illustrative diagrammatic general view of an Internet system according to an embodiment of the present invention is shown. Web host 29 monitors and controls the print quality levels of printed images made from image capturing recording devices, e.g. camera 13 within a variety of subscribing image content providing facilities 11, 15 and 17 to control the image quality of printed images made from the captured image content. Assume that the owner of camera 13 is touring and visits several facilities: museum 11, music hall 15 and botanical gardens 17. All of these facilities wish to control the image quality of images captured by digital camera 13 within their respective facilities. Limiting the quality is intended to include the complete prohibiting of printed images of the content in certain areas of the facilities. The facilities have subscribed to the services of control host 29 via the host computer and the host has provided via the Web appropriate routines to be hereinafter described for offering to the camera 13 user the selection of a plurality of print quality levels for prints made from facility content captured by digital camera 13.

As digital camera 13 enters each of the facilities, the camera is identified, e.g. by a transponder in the camera. An exemplary identification method is described in detail in the cross-referenced copending application. Thus, the presence of camera 13 is tracked as it moves through each facility (as described in the exemplary embodiment in the cross-referenced application). Each image captured at each location within each facility is tagged with an identification tag indicating the specific location within the specific facility that the image was captured. It should be noted that, as described in the cross-referenced application, each facility may be divided into subunits with different sets of image print quality levels offered for each subunit. The respective location tags for each subunit may be encoded into each captured image. For example, the cross-referenced application describes an embodiment for the tracking of the location of the digital camera through sensors wirelessly connected to a facility control center through RF transmission. The digital camera may be provided with a locator routine wherein its transponder is activated when it performs an image capture. The location of the camera is communicated to the facility control center which then RF transmits a location tag indicating the location of the image captured back to the camera 13. Reference is again made to the cross-referenced application for details of an embodiment to transmit from facility control center to the digital camera 13. As the camera visits each location in each facility 11, 15 and 17, the image captured by camera 13 does not vary in quality, e.g. resolution. However, each captured image has a location tag that identifies each location.

Thus, when (FIG. 1) the user with camera 13 returns to his computer station or terminal 21, all of his captured images are of the same high resolution but may have different location tags that are used to determine the printed image quality levels that will be available to the user when requested to print from his stored digital image content on printer 19 under control of computer 21. In order to print captured images, the user must connect through Web server 23 and Web 25 to the host 29 of the facilities print quality management system who may be remotely connected to the Web via server 27. Now, under the control of the facilities print content control host 29 through control routines that will be described in greater detail in the flow diagrams of FIGS. 3-5, as the user requests the printing of each captured image or set of captured images, the user is offered a selection of a plurality of quality levels for the printed image as related to the image capture location tag. Conditions such as processing fees may be charged that may be billed by the host 29 using conventional Web billing routines; or other conditions or charges may be made as the user requests the printing (as it would be appreciated by one skilled in the art).

Figure 2:
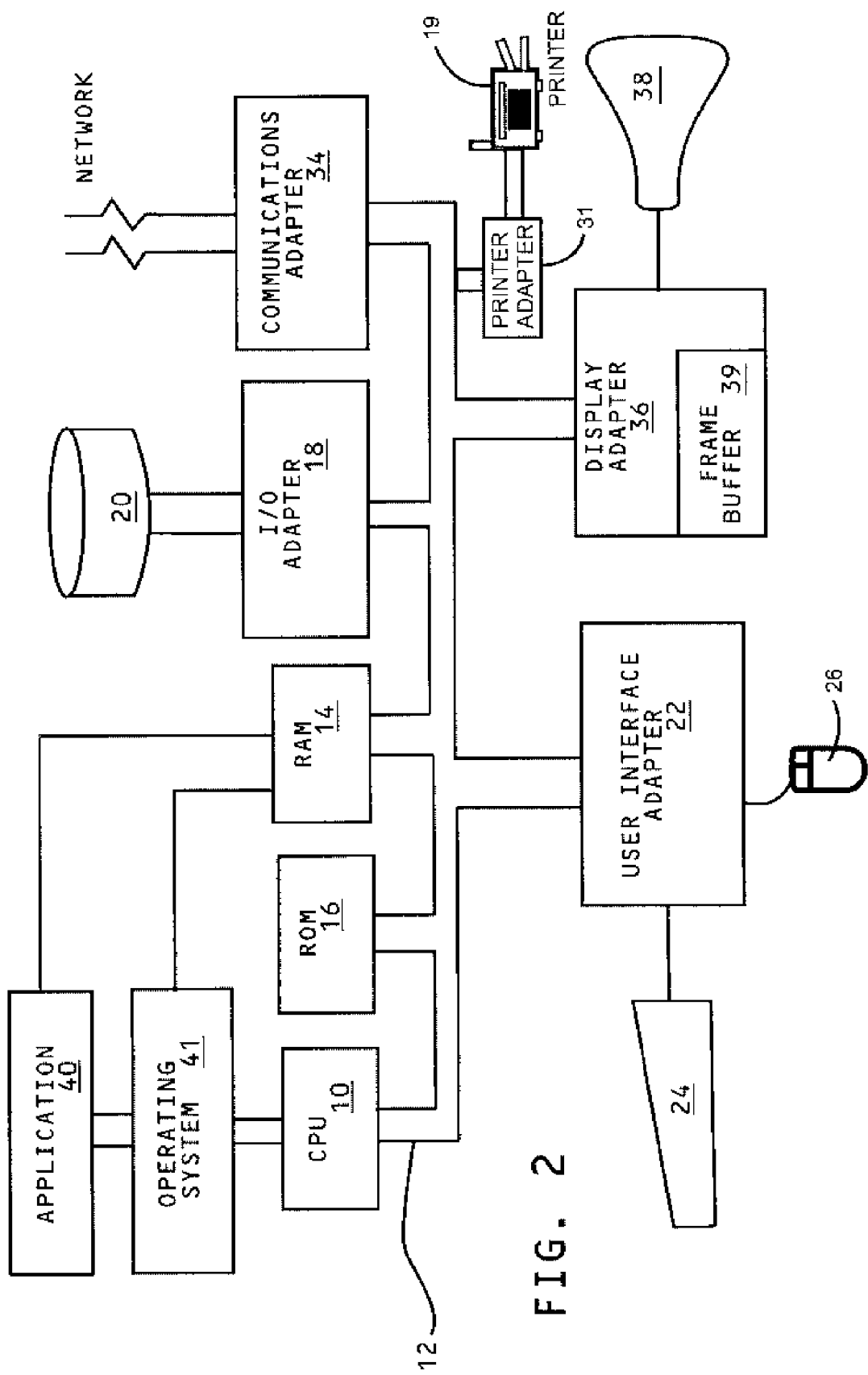
FIG. 2 is a block diagram of an exemplary data processing system including a central processing unit and network connections via a communications adapter that is capable of functioning as the computer controlling the printer of images or any of the servers in FIG. 1.

FIG. 2 is a block diagram of an exemplary data processing system including a central processing unit and network connections via a communications adapter that is capable of functioning as computers 21 controlling printer 19, host control computer 29 (FIG. 1) or any of the servers 23 or 27 shown in FIG. 1. A central processing unit (CPU) 10, such as one of the PC microprocessors or workstations, e.g. RISC System/6000™ series available from International Business Machines Corporation (IBM), or Dell™ or Lenovo™ PC microprocessors, is provided and interconnected to various other components by system bus 12. An operating system 41 runs on CPU 10, provides control and is used to coordinate the function of the various components of FIG. 1. Operating system 41 may be one of the commercially available operating systems, such as IBM's AIX 6000™ operating system or Microsoft's WindowsXP™ or Windows2000™, as well as UNIX and other IBM AIX operating systems. Application programs 40, controlled by the system, are moved into and out of the main memory Random Access Memory (RAM) 14. These programs, in the appropriate servers or client computers, include the routines of the present invention for controlling printer 19 or the program in the host computer for offering the user a selection of printed image quality levels through host computer 29, which will hereinafter be described in greater detail. It should be noted that with the connection of printer adapter 31 and printer 19, the computer set up in FIG.

2 specifically represents computer 21 in FIG. 1. However, the basic computer structure is applicable to all the servers and computers shown in FIG. 1.

A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with the outside network. I/O devices are also connected to system bus 12 via user interface adapter 22 and display adapter 36. Keyboard 24 and mouse 26 are all interconnected to bus 12 through user interface adapter 22. It is through such input devices that the user may interactively relate to the programs of this invention. In the computers or servers having a display, there is a display adapter 36, including a frame buffer 39 that is a storage device that holds a representation of each pixel on the display screen 38. Images may be stored in frame buffer 39 for display on monitor 38. By using the aforementioned I/O devices, a user is capable of inputting information to the system through keyboard 24 or mouse 26 or touch pad (not shown) and receiving output information from the system via display 38.

Figure 3:
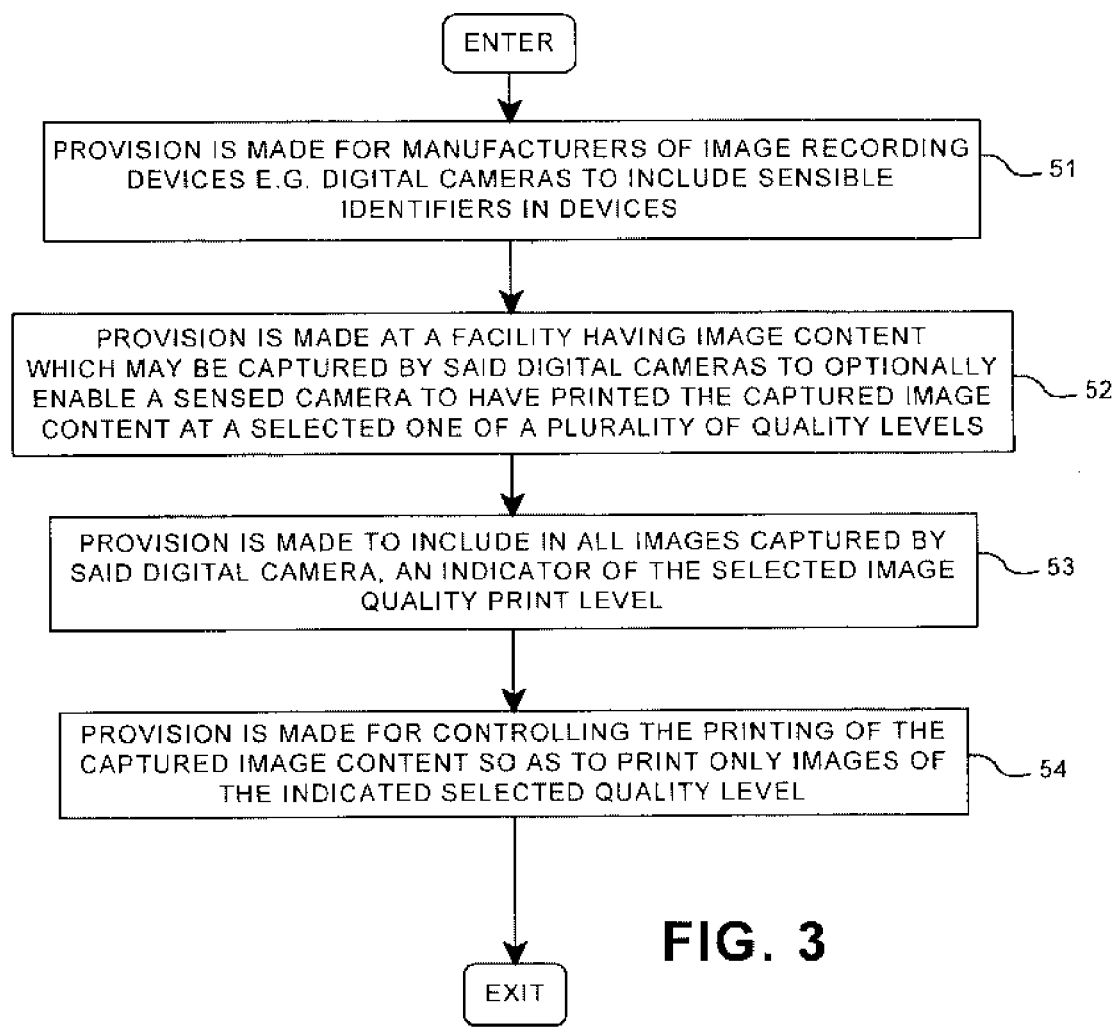
FIG. 3 is an illustrative flowchart describing the setting up of the process of the present invention for the control of image capturing recording devices within a controlled facility and the controlled quality level printing of such captured images.

Now, with reference to FIG. 3, there will be described a process implemented by a program according to an embodiment of the present invention for a universal system for controlling the use of image content capturing recording devices, e.g. digital cameras in facilities where such use intrudes on privacy or may result in the loss of intellectual property. Provision is made, by law or industry standards, for manufacturers of image content capturing devices to include identifiers capable of being sensed in the devices, step 51. Provision is made at a facility having image content that may be captured by a digital camera to optionally enable a sensed camera to have the captured image content printed at a user selected one of a plurality of quality levels, step 52. Provision is made to include an indicator of the selected image quality print level in all images captured by the digital camera, step 53. Finally, provision is made for controlling the printing of the captured image content so as to print only images of the indicated selected quality level, step 54. Thus, for best results in the practice of this invention, the digital camera is permitted to capture one predetermined resolution and one predetermined quality image. However, the printing of the respective image content is controlled so that the resolution is appropriately reduced to reflect the selected level of image quality. Also, it should be noted that irrespective of the image quality level that may have been selected by the camera user at the facility providing the content, the user may select to change the printed image quality level at any time prior to printing. In such a case, it is only necessary to change the image quality indicator associated with the recorded image content that was set up in step 53.

Figure 4:
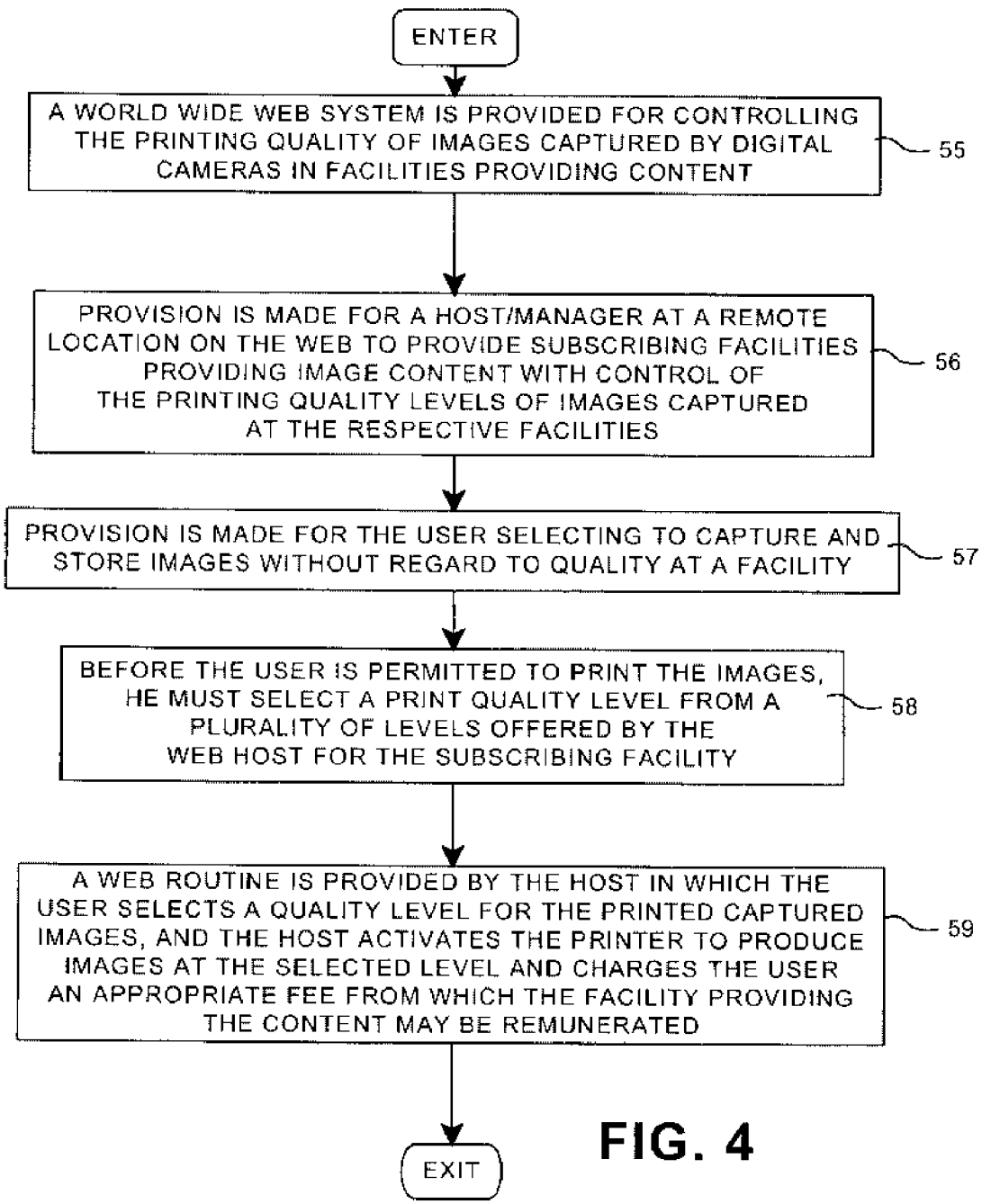
FIG. 4 is an illustrative flowchart describing the setting up of the process of the present invention for the Web host control of quality level printing of images captured by image capturing recording devices within subscribing facilities.
Figure 5:
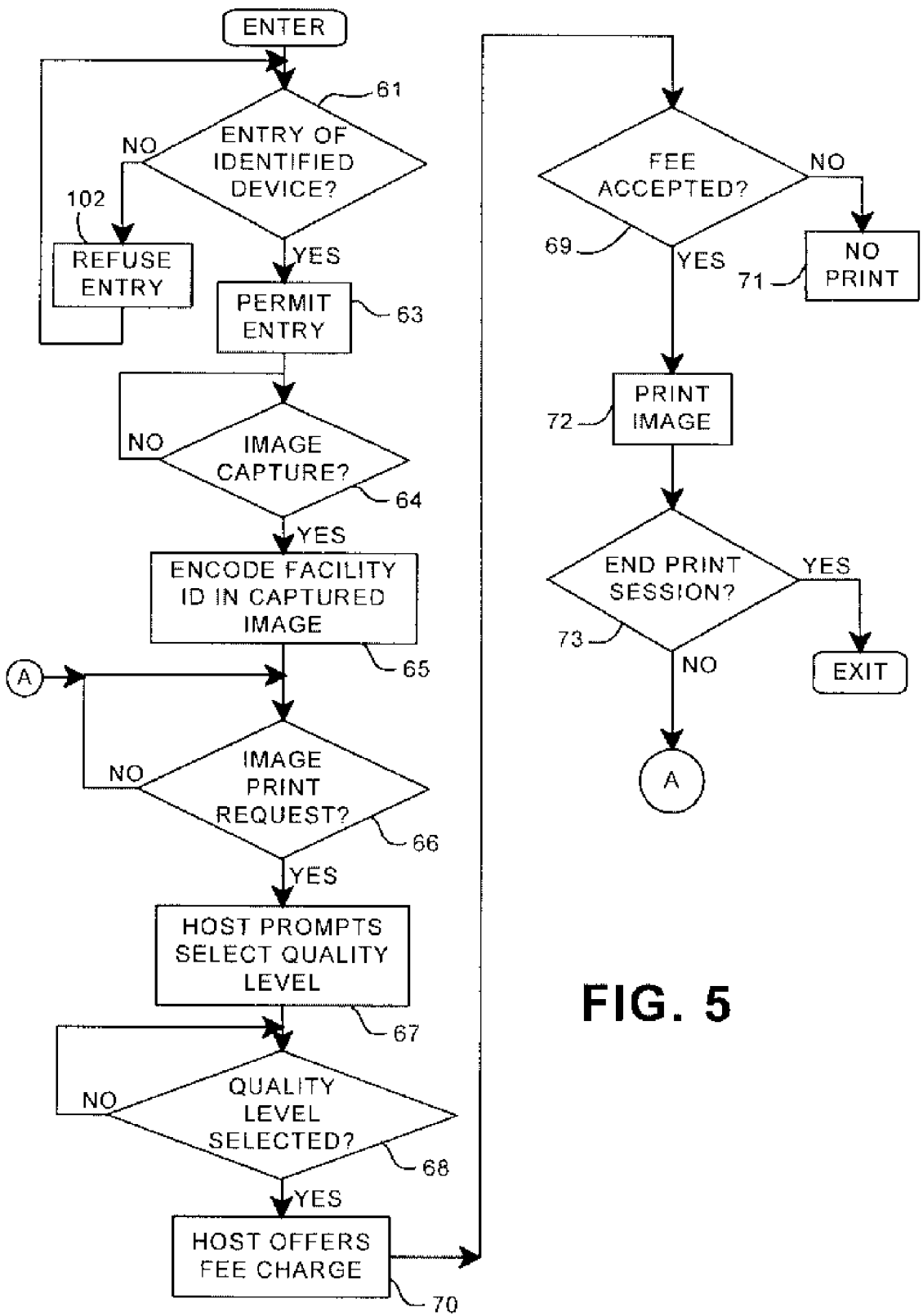
FIG. 5 is a flowchart of an illustrative run of the process set up in FIG. 4.

Now with reference to FIG. 4 another aspect of the present invention, there will be described a process implemented by a program according to an embodiment of the present invention for a system for controlling the use of image content capturing recording devices as managed by a remote host on the Web who has several image content facility subscribers for whom the quality level of the printing of images are controlled by the host. A Web system is provided for controlling the printing quality of images captured by digital cameras in the subscribing facilities that provide the digital image content, step 55. There is provision for a host manager at a remote location on the Web to provide subscribing facilities having image content that may be captured with control of the printing quality levels of images captured at the respective facilities, step 56. Provision is made for enabling the user to capture and store images at a single quality level, i.e. the highest resolution level, step 57. Before the user is enabled to print the images, provision is made for prompting the user to select a quality level from a plurality of levels offered by the Web host to the user, step 58. An option selection routine is provided by the host wherein the user selects a quality level for the printed images, and the host activates the printer to produce images at the selected level. For example, as previously described, the captured images have been transferred from camera 13 to computer 21 (FIG. 1) where the images are stored. When the user wishes to print a selected image stored on his computer, he requests the printed image from his stored data from the host computer 26 via the Web. All that need be transmitted from the user computer 21 to the host computer 29 is the location identifier that was recorded in association with the captured image at the facility where the image was captured. The host determines and may charge the user an appropriate fee or apply other restrictions based upon the quality level selected relative to the location identifier from which the facility providing the captured image content may be remunerated, step 59. These restrictions may include limits on the number of copies or prints that may be made. The restrictions may require the file be deleted. This may be readily done by associating and storing a deletion with the already printed and identified file at the host computer.

Now that the basic programs have been described and illustrated by exemplary FIG. 3, there will be described with respect to FIG. 4 an exemplary flow of a simple operation showing how the program may be run to provide for the printing of captured image content at a selected printed image quality level. An initial determination is made as to whether there is a request to enter the facility by an image recording device, e.g. camera that is qualified, i.e. has an appropriate identifier, step 61. For example, the camera has to be trackable, e.g. it should have some sort of transponder so that its location may be tracked. Accordingly, an identifier put on the camera by the vendor or manufacturer would indicate this. An industry standard could require qualified cameras to be recognizable as such through an appropriate identifier. The facility would have an entry procedure in which only cameras identified visually or by a scanner would be let in. If No, entry is refused, step 62, and the process returns to step 61. If Yes, step 63, entry is approved, the location of the device within the facility is tracked. As set forth above, the cross-referenced application describes an embodiment for the tracking of the location of the digital camera through sensors wirelessly connected to a facility control center through RF transmission. The digital camera may be provided with a locator routine wherein its transponder is activated when it performs an image capture. The location of the camera is communicated to the facility control center which then RF transmits a location tag indicating the location of the image captured back to the camera 13. At a particular location in a facility, a determination is made as to whether the user is capturing an image with a digital camera, step 64. If Yes, the identifier of the facility or of a special location within a facility is included in the captured digital image, step 65. Then, at some point, a determination is made as to whether the printing of a captured digital image has been requested, step 66. If Yes, the host manager prompts the user to select an image quality level, step 67. Then a determination is made, step 68, as to whether the user has selected a quality level. If Yes the manager offers to enable the printing of the image at the selected quality level for a fee charge, step 70. A determination is made, step 69, as to whether the fee charge is accepted. If No, the image is not printed, step 71. In one embodiment, the image is printed but at a lesser quality then the selected image quality if the charges are not accepted. If Yes, the image is printed at the selected quality level, step 72. At this point, a determination may be conveniently made as to whether the print session is at an end, step 73. If Yes, the session is exited. If No, the process is branched back to step 66 via Branch "A".

While the invention has been shown and described with reference to particular embodiments thereof, it will be understood by those skilled in the art that the foregoing and other changes in form and detail may be made therein without departing from the spirit and scope of the invention.

What is claimed is:

1. A method of enabling a facility providing image content to control the print quality of images printed from image content captured by image recording devices of facility invitees comprising:
    predetermining a plurality of levels of image print quality by said facility providing the image content;
    enabling an invitee to select under control of said facility a level of image print quality from the plurality of levels of image print quality;
    responsive to said invitee's selection of a level of image print' quality, said facility inserting, via a wireless RF signal an indicator of said selected level into said captured image content;
    capturing said image content by said invitee with said recording device at said facility; and enabling said invitee to print, under control of said facility, said captured content at said selected level of image print quality based upon said inserted indicator;
    wherein the facility is a location where the images are captured.

2. The method of claim 1 wherein said step of enabling said user to select is performed after the image is captured.

3. The method of claim 1 further including the step of enabling said facility to charge said user a fee that corresponds to said selected at least one level of said selected image print quality.

4. The method of claim 3 wherein said captured content is a recorded electronic digital image.

5. The method of claim 4 wherein said user is enabled to select multiple levels of image print quality.

6. The method of claim 5 wherein said facility is enabled to change said user fee responsive to a change in said selected at least one level of image print quality.

7. A system for enabling a facility providing image content to control the print quality of images printed from image content captured by image recording devices of facility invitees, the system comprising:
    a processor;
    a computer memory holding computer program instructions which when executed by the processor perform the method comprising:
    predetermining a plurality of levels of image print quality by said facility providing the image content;
    enabling an invitee to select under" control of said facility a level of image print quality from the plurality of levels of image print quality;
    responsive to said invitee's selection of a level of image print quality, said facility inserting, via a wireless RF signal, an indicator of said selected [level into said captured image content; capturing said image content by said invitee with said recording device at said facility; and
    enabling said invitee to print, under control of said facility, said captured content at said selected level of image print quality based upon said inserted indicator;
    wherein the facility is a location where the images are captured.

8. The system for printing images of claim 7 wherein said step of enabling said user to select is performed after the image is captured.

9. The system for printing images of claim 8 wherein the performed method further includes charging said user a fee that corresponds to said selected at least one level of said selected image print quality.

10. The system for printing images of claim 9 wherein the performed method further includes enabling said user to change a selected level of image print quality.

11. The system for printing images of claim 10 wherein the performed method further includes enabling said facility to change said user fee responsive to a change in said selected at least one level of image print quality.

12. A computer usable non-transitory storage medium having stored thereon a computer readable program for enabling a facility providing image content to control the print quality of images printed from image content captured by image recording devices of facility invitees,
    wherein the computer readable program when executed on a computer causes the computer to:
    predetermine a plurality of levels of image print quality by said facility providing the image content;
    enable an invitee to select under control of said facility a level of image print quality from the plurality of levels of image print quality;
    responsive to said invitee's selection of a level of image print quality, cause said facility to insert, via a wireless RF signal, an indicator of said selected level into said captured image content;
    capturing said image content by said invitee with said recording device at said facility; and
    enabling said invitee to print, under control of said facility, said captured content at said selected level of image print quality based upon said inserted indicator;
    wherein the facility is a location where the images are captured.

13. The computer usable storage medium of claim 12, wherein said enabling said user to select is carried out after the image is captured.

14. The computer usable storage medium of claim 12, wherein the computer program when executed further causes the computer to enable said facility to charge said user a fee that corresponds to said selected at least one level of said selected image print quality.

15. The computer usable storage medium of claim 12, wherein said captured content is a recorded electronic digital image.

16. The computer usable storage medium of claim 12, wherein the computer program when executed further causes the computer to enable said user to select multiple levels of image print quality.

17. The computer usable storage medium of claim 12, wherein the computer program when executed further causes the computer to enable said user to change a selected level of image print quality.

18. The computer usable storage medium of claim 17, wherein the computer program when executed further causes the computer to enable said facility to change said user fee responsive to a change in said selected at least one level of image print quality.

* * * * *